United States Patent [19]

Sagara

[11] Patent Number: 5,125,285
[45] Date of Patent: Jun. 30, 1992

[54] CONTROL ARRANGEMENT FOR VEHICULAR MANUAL TRANSMISSION

[75] Inventor: Kiyoshi Sagara, Kanagawa, Japan

[73] Assignee: Nissan Motor Co., Ltd., Yokohama, Japan

[21] Appl. No.: 684,604

[22] Filed: Apr. 12, 1991

[30] Foreign Application Priority Data

May 1, 1990 [JP] Japan ................... 2-115598

[51] Int. Cl.⁵ .................................... B60K 20/00
[52] U.S. Cl. .......................................... 74/473 R
[58] Field of Search .............................. 74/473 R

[56] References Cited

U.S. PATENT DOCUMENTS

| | | | |
|---|---|---|---|
| 1,469,579 | 10/1923 | Borden | 74/473 R X |
| 1,673,795 | 6/1928 | Beck | 74/473 R |
| 2,221,976 | 11/1940 | Kurtz | 74/473 R |
| 4,311,064 | 1/1982 | Sukeshita | 74/473 R |
| 4,799,397 | 1/1989 | Egidi et al. | 74/473 R |
| 4,873,883 | 10/1989 | Venant | 74/473 R |

OTHER PUBLICATIONS

"Newly compiled automotive vehicle engineering handbook" vol. 5, pp. 1-10, published in Jun. 1983, by the Automotive Vehicle Engineering Association Corporation.

Primary Examiner—Allan D. Herrmann
Assistant Examiner—David W. Laub
Attorney, Agent, or Firm—Foley & Lardner

[57] ABSTRACT

A forward and transversely mounted engine is provided with a transaxle including a manual transmission having a striking rod for accomplishing shifting and selecting operations for the gear mechanism of the transmission. The striking rod is located at an upper part of the transmission and projected rearward of an end of the transaxle. The projected end section of the striking rod is operatively connected through a speed changing control rod to a shift lever. The control rod is connected to and offset lower relative to the striking rod projected end section, so that the control rod is positioned lower as a whole.

7 Claims, 2 Drawing Sheets

CONTROL ARRANGEMENT FOR VEHICULAR MANUAL TRANSMISSION

BACKGROUND OF THE INVENTION

1. Field of the Invention

This invention relates to improvements in a control arrangement for a manual transmission of a vehicle which arrangement is between a shift lever and the transmission, and more particularly to the improvements in the control arrangement for a transaxle combined with a transversely mounted engine.

2. Description of the Prior Art

In general, a front wheel front drive type automotive vehicle is usually provided with a forward and transversely mounted engine with which a so-called transaxle is combined. The transaxle includes a transmission and a differential. Such an arrangement is disclosed for example in a Japanese document "Newly Compiled Automotive Vehicle Engineering Handbook", the fifth volume, Pages 1-10 FIGS. 1-21 (published in June, 1983 by Automotive vehicle Engineering Association Corporation).

The arrangement in case of using a manual transmission will be discussed with reference to FIG. 1 of the present application, in which an operational effort of a shift lever 1 disposed near a driver's seat (not shown) is transmitted through a speed changing control rod 2 to a manual transmission 3. The rear end section of the control rod 2 is rotatably connected with the bottom section of the shift lever 1, while the front end section of the same is connected to a striking rod 4 which is arranged to be rotatable and axially movable to make shifting and selecting operations for the gear mechanism of the transmission under operation of the shift lever 1. The striking rod 4 is movably disposed at the upper part of a transmission housing 3a covering the transaxle.

However, difficulties have been encountered in the above arrangement shown in FIG. 1 as set forth below. The control rod 2 is connected in alignment with the striking rod 4 located at and projecting from the upper part of the transmission housing 3a, and therefore the control rod 2 is unavoidably positioned relatively high in level. Accordingly, a tunnel-like or semicylindrical section 6 of a dashboard lower panel 5 for surrounding or covering the control rpd 2 is necessarily positioned high to be aligned with the striking rod 4. This narrows the space for driver's feet in the forward part of a passenger compartment.

In view of the above, it may be proposed to lower the position of the tunnel section 6 in order to widen the space for the driver's feet. For this purpose, the control rod 2 is bent downward to form a bent portion as indicated in phantom in FIG. 1 so as to be prevented from interference with the dashboard lower panel 5. The thus formed bent portion causes the control rod 2 to be lowered in rigidity, thereby making impossible an effective control of the manual transmission by the shift lever 1. Additionally, since the joint between the control rod 2 and the striking rod 2 is positioned above the transmission housing 3a, disconnecting operation of the control rod 2 is made difficult for a repair man located under the vehicle during repairing, thus rendering repairing operations difficult.

SUMMARY OF THE INVENTION

An object of the present invention is to provide an improved control arrangement for a vehicular manual transmission by which difficulties encountered in conventional control arrangements for a manual transmission can be solved.

Another object of the present invention is to provide an improved control arrangement for a vehicular manual transmission by which the space for passengers in a passenger compartment are widened maintaining an effective operation to the manual transmission by a shift lever.

A further object of the present invention is to provide an improved control arrangement for a vehicular manual transmission by which a tunnel-like or semicylindrical section of a dashboard lower panel is positioned low maintaining the rigidity of a speed changing control rod sufficiently high.

A still further object of the present invention is to provide an improved control arrangement for a vehicular manual transmission by which disconnecting operation for a speed changing control rod is facilitated during repairing.

The control arrangement of the present invention is for a vehicular manual transmission located in abutment with a passenger compartment and housed in a transmission housing. The transmission is incorporated with a final speed reduction unit. The control arrangement is comprised of a striking rod connected with a gear mechanism of the transmission to control the transmission in accordance with operation of a shift lever. The striking rod is disposed in an upper section of the transmission housing and projected generally in a direction of the passenger compartment over an end of the transmission housing. A control rod is provided so that its first end section is connected with the shift lever. Additionally, an offset yoke is provided to connect the second end section of the control rod and the striking rod. The offset yoke extends vertically so that the second end section of the control rod is vertically separate from the striking rod by a predetermined distance.

By virtue of the offset yoke, the control rod is positioned offset lower from the striking rod located at the upper section of the transmission housing. As a result, the control rod can be lowered in position as a whole maintaining its straight state in which the rigidity of the control rod is high, thus making it possible to lower the position of the tunnel-like or semicylindrical section of a dashboard lower panel. Additionally, the joint between the control rod and the striking rod is located projected over the end (on the side of the passenger compartment) of the transmission housing. This facilitates observation of the joint and disconnecting operation for the control rod by a repair man located under the vehicle, thus facilitating repairing of the control arrangement.

DETAILED DESCRIPTION OF THE INVENTION

Figure 1:
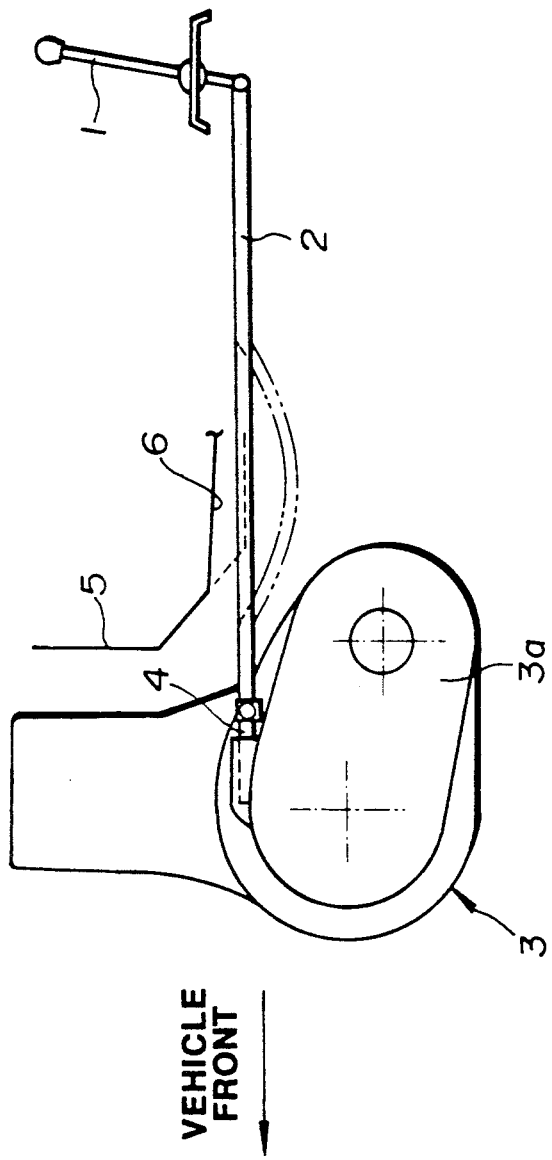
FIG. 1 is a side view of a conventional control arrangement for a manual transmission.
Figure 2:
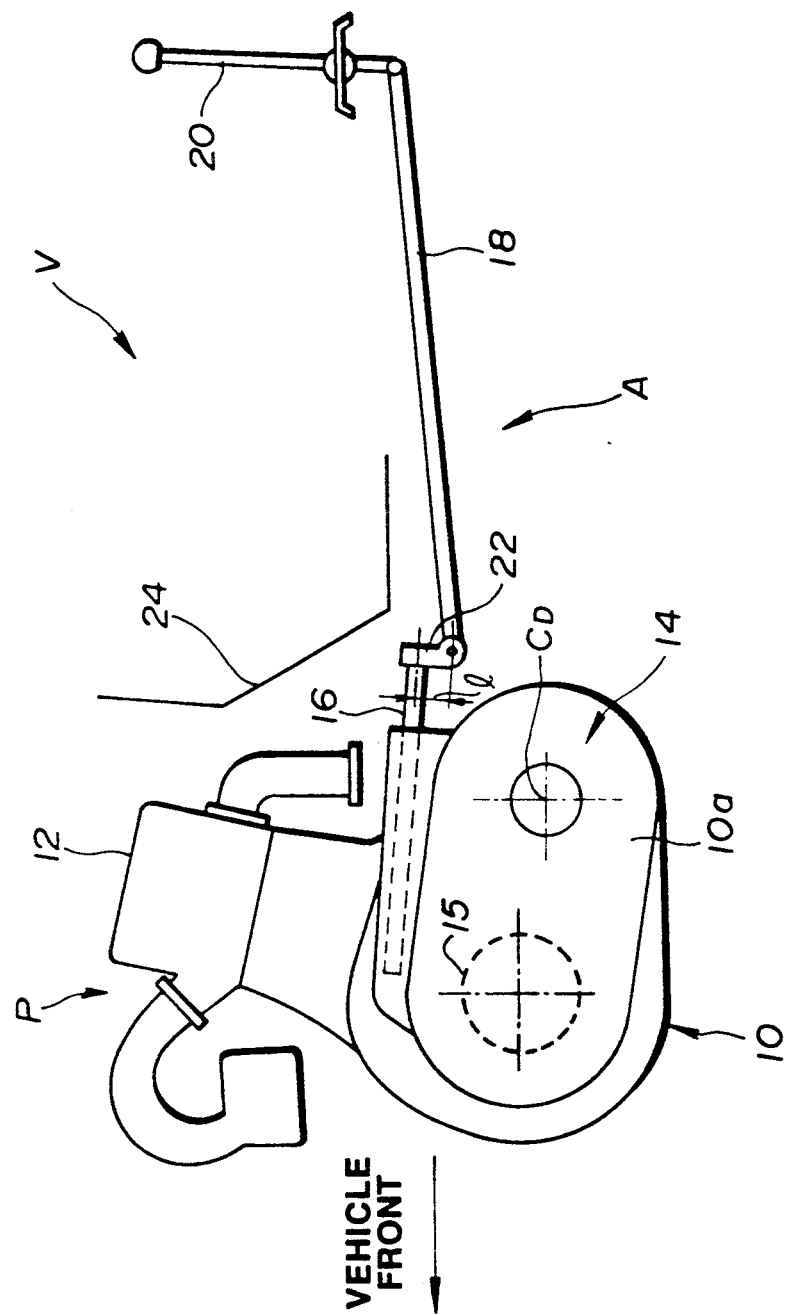
FIG. 2 is a side view of a control arrangement for a manual transmission, in accordance with the present invention.

Referring now to FIG. 2 of the drawings, there is shown an embodiment of a control arrangement for a manual transmission of an automotive vehicle A according to the present invention as illustrated by the reference character of A. The automotive vehicle V comprises a power plant P. In this embodiment, the automotive vehicle V is of the front engine front wheel drive type and therefore is provided with a forward and transversely mounted engine 12. A manual transmission 10 is incorporated with the cylinder block of the engine 12 to form a single unit. Additionally, a final speed reduction unit 14 including a final gear and a differential is incorporated with the manual transmission 10 to form a single unit or a so-called transaxle.

The final speed reduction unit 14 together with the transmission 10 are covered with a transmission housing 10a which projects rearward of the vehicle. A drive shaft (not shown) for driving front wheels (not shown) is drivably connected to the final speed reduction unit 14 in a manner that the axis thereof is aligned with the center $C_D$ of the differential. The transmission 10 includes a striking rod 16 connected with a shifting fork (not shown) for operating the gear mechanism 15 of the transmission 10. More specifically, the striking rod 16 causes the shifting fork to make shifting and selecting operations for the gear mechanism.

The striking rod 16 is positioned at the upper section of the transmission housing 10a and projects rearward of the vehicle so that the rear end section thereof extends out of the transmission housing 10a. The striking rod 16 is arranged to be rotatable and axially movable relative to the transmission housing 10a in order to accomplish the shifting and selecting operations for the gear mechanism 15. In this embodiment, the rear end section of the striking rod 16 extends rearward of the rear-most end of the transmission housing 10a. The rear end section of the striking rod 16 is provided with an offset yoke 22 which extends generally vertical to the striking rod 16. The yoke 22 has an upper end section which is fixedly mounted on the rear end section of the striking rod 16. Thus, the yoke 22 extends generally downward of the striking rod 16, so that the lower end section of the yoke 22 is positioned lower in level than the upper end section of the same in the vertical direction of the vehicle.

A speed changing control rod 18 for the striking rod 18 is provided to connect the yoke 22 and a shift lever 20 which is operated by a driver to accomplish the shifting and selecting operations for the transmission gear mechanism. The front end section of the control rod 18 is rotatably connected to the lower end section of the yoke 22, while the rear end section of the same is connected to the shift lever 20. Thus, the control rod 18 is connected through the yoke 22 to the striking rod 16 upon being offset by an offset amount or distance λ.

With the above-discussed arrangement, the front end section of the control rod 18 can be disposed lower by the offset amount. This makes possible to lower the position of the control rod 18 as a whole and therefore prevents the control rod 18 from interference with a dashboard lower panel 24. As a result, the position of the dashboard lower panel 24 can be lowered thereby widening the space of a passenger compartment, particularly the space at which the feet of the driver and/or passenger are positioned. In this regard, in case the dashboard lower panel 24 is formed with a tunnel-like or semicylindrical section (not shown) for surrounding the control rod 18, the tunnel like section can be positioned further lowered or removed, thereby further widening the space of the passenger compartment.

Additionally, the control rod 18 is not required to be curved and therefore formed straight, so that the rigidity of the control rod 18 is set high thereby enabling the control rod 18 to be smaller in diameter and light in weight.

Furthermore, since the rear end section of the striking rod 16 to which the control rod 18 is connected is projected rearward of the rear-most end of the transmission housing 10a, the joint between the striking rod 16 and the control rod 18 can be clearly observed during repairing particularly when the control rod 18 is disconnected by a repair man under the vehicle, thus improving the operation efficiency for repairing.

What is claimed is:

1. A control arrangement for a vehicular manual transmission located in abutment with a passenger compartment, the transmission incorporating a final speed reduction unit and enclosed by a transmission housing, said control arrangement comprising:

a striking rod connected with a gear mechanism of the transmission to control the transmission in accordance with operation of a shift lever, said striking rod being disposed in an upper section of the transmission housing and projected generally in a direction of the passenger compartment over an end of the transmission housing;

a control rod connected at a first end section with the shift lever; and an offset yoke for connecting a second end section of said control rod with said striking rod, said offset yoke extending perpendicular to said striking rod so that the second end section of said control rod is longitudinally separated from said striking rod by a predetermined distance and positioned below said striking rod.

2. A vehicle comprising:
   a transversely mounted vehicle engine;
   a transmission housing;
   a manual transmission incorporated with said engine, said manual transmission incorporating a final speed reduction unit enclosed in said transmission housing, said transmission being located in abutment with a passenger compartment, of said vehicle; and a control arrangement comprising a striking rod connected with a gear mechanism of said transmission to control said transmission in accordance with operation of a shift lever, said striking rod being disposed in an upper section of said transmission housing and projected generally in a direction of the passenger compartment over an end of the transmission housing;

a control rod having a first end section connected to the shift lever and a second end section; and an offset yoke for connecting said striking rod and said control rod, said offset yoke extending vertically and having a first end section connected with said striking rod, and a second end section connected with said second end section of the control rod so that said second end section of said control rod is longitudinally separated from said striking rod by a predetermined distance and positioned below said striking rod.

3. A vehicle as claimed in claim 2, wherein said transversely mounted engine is mounted on a front engine front wheel drive type automotive vehicle.

4. A vehicle as claimed in claim 2, wherein said transmission and said final speed reduction unit constitute a transaxle.

5. A vehicle as claimed in claim 2, wherein said transmission is located in abutment with a panel defining a space in which the feet of a vehicle driver are located, wherein said control rod is located below said space defining panel.

6. A combination as claimed in claim 2, wherein said striking rod extends horizontal relative to the vehicle and generally parallel with said control rod.

7. A vehicle as claimed in claim 2, wherein said first end section of said offset yoke is fixedly connected with said striking rod, wherein said control rod second end section is rotatably connected with said offset yoke second end section.

* * * * *